3,825,562
PROCESS FOR RECOVERING 2,2,4-TRIMETHYL-4-(4-HYDROXYPHENYL) CHROMAN
Donald B. G. Jaquiss, New Harmony, Ind., assignor to General Electric Company
No Drawing. Filed July 18, 1972, Ser. No. 272,799
Int. Cl. C07d 7/32
U.S. Cl. 260—345.2                    4 Claims

ABSTRACT OF THE DISCLOSURE

A process for recovering pure 2,2,4-trimethyl-4-(4-hydroxyphenyl) chroman from the by-products of reaction of acetone and phenol to prepare 2,2-bis(4-hydroxyphenyl) propane which process consists of treating the by-product stream with an aqueous caustic solution of at least 2N to dissolve the byproducts and then adjusting the pH to at least 10.0 in order to precipitate 2,2,4-trimethyl-4-(4-hydroxyphenyl) chroman.

---

This invention relates to a process for obtaining a particular substituted chroman namely 2,2,4-trimethyl-4-(4-hydroxyphenyl) chroman in a purity of at least 98 weight percent and preferably 100 weight percent.

BACKGROUND OF THE INVENTION

The chroman compounds and in particular the substituted chroman 2,2,4-trimethyl-4-(4-hydroxyphenyl) chroman (hereinafter referred to as chroman-I), are not an easily obtainable compound that is available from a commercial chemical facility. Yet chroman-I is a valuable product for use as a molecular weight regulator in processes for preparing polycarbonates from the reaction of 2,2-bis(4-hydroxyphenyl) propane and a carbonate precursor. The chroman-I when used as a molecular weight regulator can control the weight average molecular weight of the polycarbonate from about 1000 to about 100,000 depending upon the desired molecular weight wanted.

The utility of substituted chromans and in particular chroman-I has been shown in U.S. patent application Ser. No. 122,087 filed Mar. 8, 1971, now U.S. Pat. 3,697,481 which is hereby incorporated herein by reference. Specifically, the chroman-I is coreacted with bisphenol-A and a carbonate precursor so as to provide a polycarbonate having as terminal groups particular chromanyl radicals. When using chroman-I, the polycarbonate contains terminal groups as described by the following formula:

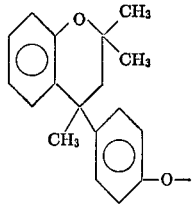

Carbonate polymers terminated with the above chromanyl radical have excellent controlled molecular weight, excellent thermal oxidative stability and improved heat aged ductility retention.

As stated above chroman-I is not readily available commerically but is a valuable product in the synthesis of polycarbonate resins. Chroman-I has been discovered in the by-product stream from the reaction of acetone and phenol to produce 2,2-bis(4-hydroxyphenyl) propane (hereinafter referred to as bisphenol-A). The by-product stream from the reaction contains essentially chroman-I, para-para bisphenol-A and ortho-para bisphenol-A.

The reaction for preparing bisphenol-A consists of reacting phenol with acetone in the presence of an acid-binding condensing agent and optionally a sulfur-containing catalyst. The reaction is most favorably carried out at below 80° C. using at least three moles of phenol per mole of acetone and employing hydrogen chloride as the condensing agent. Other condensing agents have also been found useful such as hydrochloric acid, hydrogen bromide or mixtures of hydrogen bromine and hydrogen chloride. The crystal bisphenol-A is separated from the by-products in usual known methods. The by-product stream then contains the materials as indicated previously.

DESCRIPTION OF THE INVENTION

This invention is directed solely to the by-product stream from the reaction of phenol with acetone to prepare bisphenol-A and particularly to the process of separating chroman-I from the by-product stream.

It has now been discovered that high purity chroman-I can be obtained from the above-described by-product stream very simply and efficiently. The process consists of treating the by-product stream, which contains chroman-I, para-para bisphenol-A and ortho-para bisphenol-A, with aqueous caustic alkali of at least 2N solution to dissolve the by-product stream. When the by-product stream is dissolved the pH of the solution is adjusted to a pH of at least 10 and preferably 11–12. Crystals of very high purity chroman-I precipitate out of solution. The crystals are then separated from the liquid phase and can be recrystallized in order to achieve greater purity.

DESCRIPTION OF THE PREFERRED EMBODIMENT

The examples set forth herein are to illustrate in more detail the preferred embodiment and to illustrate more clearly the principal and practice of this invention to those skilled in the art. Where percentages or parts are mentioned, they are on a weight basis.

Example I

From the reaction for producing bisphenol-A by reacting 3 moles of phenol per mole of acetone in the presence of hydrogen chloride condensing agent, a by-product stream is obtained which is referred to as the benzene isomer stream. This benzene isomer stream is treated with sufficient 2.5N aqueous sodium hydroxide solution to dissolve the stream. The benzene isomer stream contains essentially chroman-I, para-para bisphenol-A and ortho-para bisphenol-A. The pH of the solution so obtained is then adjusted to about 11.6 with phosphoric acid at about 38° C. A precipitate forms which is filtered, washed with a raffinate pH of 7–8 and dried at about 110° C. for 8 hours. The crystals are analyzed by infrared spectrum analysis and gas chromatography and the analysis shows the precipitate to be chroman-I, namely 2,2,4-trimethyl-4-(4-hydroxyphenyl) chroman.

The purity of the precipitate is found to be about 95% weight percent of chroman-I and may be further purified by recrystallization from either isopropanol or ethylene dichloride to achieve an essentially pure chroman-I.

In the practice of this invention the aqueous alkali solutions employed are of at least 2N and up to 20N strength, but is preferably 2N–5N strength, and may be any hydroxide of the alkali group such as sodium hydroxide, lithium hydroxide, potassium hydroxide, etc.

Preferably sodium hydroxide is the aqueous alkali solution employed herein.

When adjusting the pH of the by-product solution after treating of the by-product stream, any of the well-known inorganic acids can be employed. The critical feature is that the pH must be adjusted to at least 10.0 and preferably 11.0–12.0 in the practice of this invention.

It will thus be seen that the objects set forth above among those made apparent from the preceding description are efficiently obtained, and since certain changes may be made in carrying out the above process without departing from the scope of this invention, it is intended that all matters contained in the above description shall be interpreted as illustrative and not in a limiting sense.

What is claimed is:

1. A process for obtaining pure 2,2,4-trimethyl-4-(4-hydroxyphenyl) chroman from the by-product of the reaction of phenol and acetone to produce 2,2-bis(4-hydroxyphenyl) propane, which process consists of treating the by-product stream containing 2,2,4-trimethyl-4-(4-hydroxyphenyl) chroman, p,p'-bisphenol-A and o,p'-bisphenol-A with an aqueous alkali solution of at least 2N to dissolve the by-product stream, then adjusting the solution to a pH of at least 10.0 to precipitate pure 2,2,4- trimethyl-4-(4-hydroxyphenyl) chroman and then recovering 2,2,4-trimethyl-4-(4-hydroxyphenyl)chroman in solid form.

2. The process of claim 1 wherein the aqueous alkali solution is sodium hydroxide.

3. The process of claim 1 wherein the pH is adjusted to a pH of 11.0–12.0.

4. The process of claim 1 wherein the aqueous alkali solution is 2N to 5N.

References Cited

UNITED STATES PATENTS 3,277,183   10/1966   Heller et al. _____ 260—345.2

JOHN M. FORD, Primary Examiner

U.S. Cl. X.R.

260—45.86 A